(12) United States Patent
Dhote et al.

(10) Patent No.: US 11,112,312 B2
(45) Date of Patent: Sep. 7, 2021

(54) METHOD AND APPARATUS FOR CALIBRATING A COLOR MEASUREMENT INSTRUMENT IN THE FIELD

(71) Applicant: Datacolor, Inc., Lawrenceville, NJ (US)

(72) Inventors: Nilesh B. Dhote, Ewing, NJ (US); Taeyoung Park, Princeton Junction, NJ (US)

(73) Assignee: DATACOLOR, INC., Lawrenceville, NJ (US)

( * ) Notice: Subject to any disclaimer, the term of this patent is extended or adjusted under 35 U.S.C. 154(b) by 81 days.

(21) Appl. No.: 16/451,958

(22) Filed: Jun. 25, 2019

(65) Prior Publication Data

US 2020/0408599 A1 Dec. 31, 2020

(51) Int. Cl.
*G01J 3/52* (2006.01)
*G01J 3/46* (2006.01)
*G01J 3/51* (2006.01)
*G01N 21/25* (2006.01)

(52) U.S. Cl.
CPC .............. *G01J 3/524* (2013.01); *G01J 3/465* (2013.01); *G01J 3/513* (2013.01); *G01N 21/25* (2013.01)

(58) Field of Classification Search
None
See application file for complete search history.

(56) References Cited

U.S. PATENT DOCUMENTS

| | | | | |
|---|---|---|---|---|
| 9,952,102 B1* | 4/2018 | Xu | ............ | G01J 3/462 |
| 2002/0179710 A1* | 12/2002 | Gu | ............ | G01J 3/524 |
| | | | | 235/454 |
| 2004/0233429 A1* | 11/2004 | Taylor | ............ | G01J 3/46 |
| | | | | 356/319 |
| 2017/0336257 A1* | 11/2017 | Frank | ............ | G01J 3/524 |

* cited by examiner

*Primary Examiner* — Shawn Decenzo

(57) ABSTRACT

A method includes determining a fielded color measurement instrument is not calibrated to measure light emitted by a fielded light emitting device, assembling a calibration matrix, such that a product of the calibration matrix multiplied by a response of the fielded color measurement instrument to the light emitted by the fielded light emitting device is a triplet that corresponds to a Commission Internationale de L'éclairage XYZ color space, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument, and storing the calibration matrix on the fielded color measurement instrument.

20 Claims, 3 Drawing Sheets

METHOD AND APPARATUS FOR CALIBRATING A COLOR MEASUREMENT INSTRUMENT IN THE FIELD

FIELD OF THE DISCLOSURE

The present invention generally relates to the measurement of color, and more specifically relates to the calibration of color measurement instruments for measuring the color of light emitting objects.

BACKGROUND

Color measurement instruments such as colorimeters measure the color of light emitting objects (e.g., light emitting diode (LED) lamps, computer monitors, televisions, projectors, or the like). For instance, such color measurement instruments may employ pre-computed coefficients for transforming sensor values measured by the color measurement instruments into color measurement values that correspond to the Commission Internationale de L'éclairage (CIE) XYZ color space. Typically, color measurement instruments are calibrated in the factory for specific display types and display type categories (e.g., make and model), and the coefficients are stored on the color measurement instruments as calibration matrices for the specific display types and display type categories.

SUMMARY OF THE DISCLOSURE

In one example, a method performed by a processing system includes determining that a fielded color measurement instrument has not been calibrated to measure a color of light emitted by a fielded light emitting device, wherein the fielded color measurement instrument comprises a plurality of color channels, assembling a calibration matrix, such that a product of the calibration matrix multiplied by a response of the fielded color measurement instrument to the light emitted by the fielded light emitting device is a triplet that corresponds to a Commission Internationale de L'éclairage XYZ color space, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument, and storing the calibration matrix on the fielded color measurement instrument.

In another example, a non-transitory computer-readable medium stores instructions which, when executed by a processor, cause the processor to perform operations. The operations include determining that a fielded color measurement instrument has not been calibrated to measure a color of light emitted by a fielded light emitting device, wherein the fielded color measurement instrument comprises a plurality of color channels, assembling a calibration matrix, such that a product of the calibration matrix multiplied by a response of the fielded color measurement instrument to the light emitted by the fielded light emitting device is a triplet that corresponds to a Commission Internationale de L'éclairage XYZ color space, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument, and storing the calibration matrix on the fielded color measurement instrument.

In another example, a device includes a processor and a non-transitory computer-readable medium storing instructions which, when executed by the processor, cause the processor to perform operations. The operations include determining that a fielded color measurement instrument has not been calibrated to measure a color of light emitted by a fielded light emitting device, wherein the fielded color measurement instrument comprises a plurality of color channels, assembling a calibration matrix, such that a product of the calibration matrix multiplied by a response of the fielded color measurement instrument to the light emitted by the fielded light emitting device is a triplet that corresponds to a Commission Internationale de L'éclairage XYZ color space, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument, and storing the calibration matrix on the fielded color measurement instrument.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
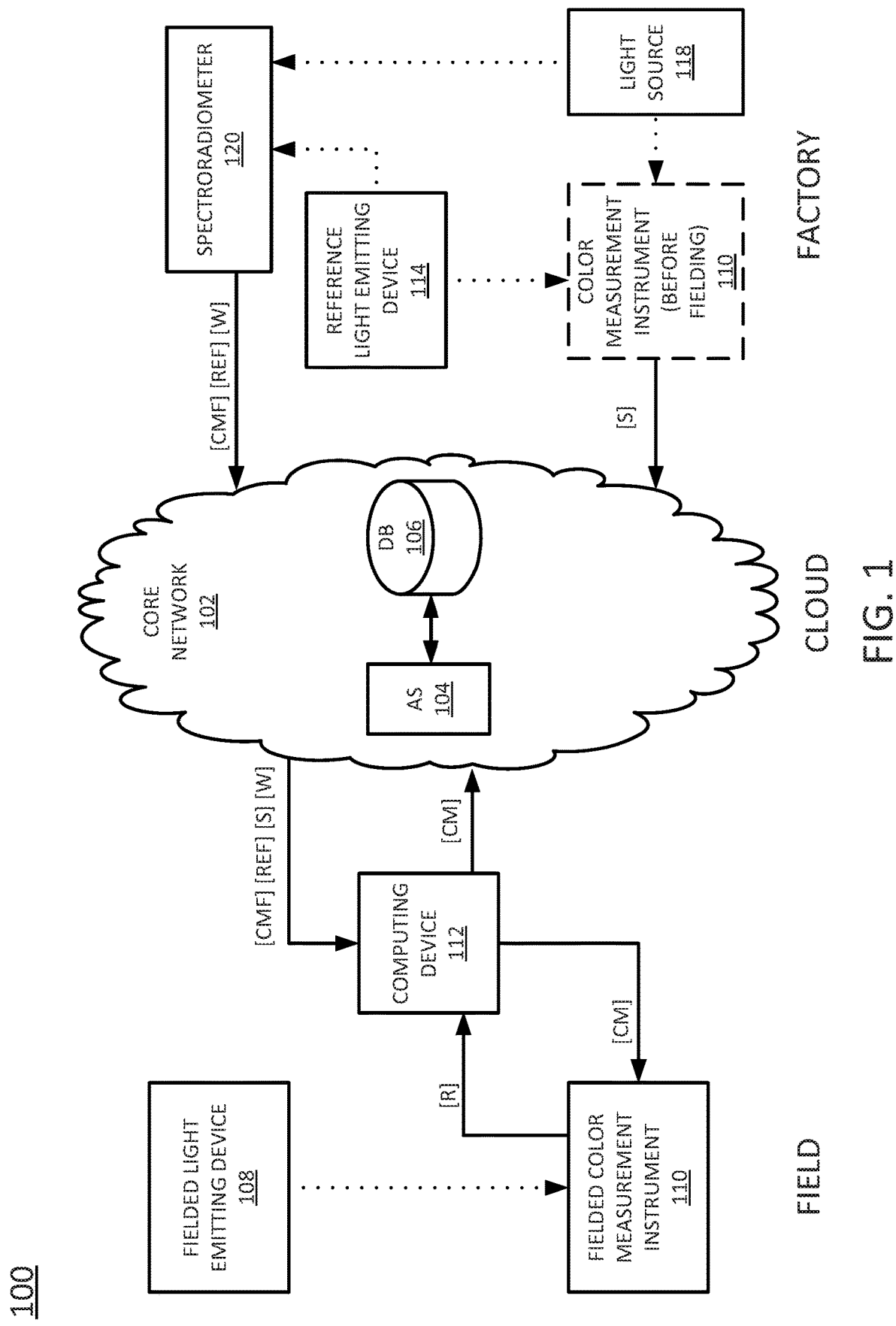
FIG. 1 illustrates an example system in which examples of the present disclosure for calibrating a multi-channel color measurement instrument in the field may operate.

In one example, the present invention includes a method, apparatus, and non-transitory computer-readable medium for calibrating a multi-channel color measurement instrument in the field. As discussed above, color measurement instruments such as colorimeters are typically calibrated in the factory for specific display types and display type categories (e.g., make and model of hardware). Coefficients that transform sensor values measured by the color measurement instruments into the CIE XYZ color space are then stored on the color measurement instruments as calibration matrices for the specific display types and display type categories. Thus, once a color measurement instrument has been calibrated (i.e., has had a calibration matrix stored thereon) and sent out into the field, the color measurement instrument is optimized to measure color on the display types that it was calibrated on.

As such, when new display type categories for the specific display types and/or new display types are introduced, a color measurement instrument that has been calibrated in the factory may be unable to measure the color of the new display type categories and/or new display types with sufficient accuracy. That is, the color measurement instrument's calibration matrix may not include the appropriate coefficients to transform the color measurement instrument's channel responses to the new display type categories and/or new display types into CIE XYZ values. In order to obtain the appropriate coefficients for the new display type categories and/or new display types, the color measurement instrument would have to be sent back to the factory and recalibrated (e.g., the calibration matrix would need to be updated) for use with the new display type categories and/or new display types.

Examples of the present invention calibrate a color measurement instrument for new display type categories and new display types (broadly referred to herein as new displays) in the field, i.e., without sending the color measurement instrument back to the factory or removing the color measurement instrument from the field. In one particular example, the present invention recomputes a calibration matrix, CM, using measured values that are generated both remotely (e.g., in the factory) using a spectroradiometer (optionally in conjunction with a tunable light source, such as a monochromator) and locally (e.g., in the field) at the color measurement instrument being calibrated and in the presence of the new display. Thus, a new calibration matrix may be constructed for the color measurement instrument using parts (e.g., measured values or matrices) that are generated in different locations, by and using different devices, without removing the color measurement instrument from the field. This saves time and labor and reduces equipment downtime.

Within the context of the present disclosure, when the term "fielded" is used to describe a color measurement instrument or a light emitting device, the term "fielded" indicates that the color measurement instrument or the light emitting device has left the factory and is "in the field" (e.g., in use by a consumer or end user).

Further examples of the present invention build upon the disclosure of U.S. Pat. No. 9,952,102 to Xu et al. (hereinafter "Xu"). As disclosed by Xu, a calibration matrix CM for a color measurement instrument being calibrated (referred to by Xu as a "target color measurement instrument") may be calculated as:

$$CM = pinv\left\{W * \begin{bmatrix} S \\ R \end{bmatrix}\right\} * W * \begin{bmatrix} CMF \\ REF \end{bmatrix} \quad (\text{EQN. 1})$$

In EQN. 1, W is a diagonal matrix (e.g., a diagonal square matrix) containing the spectrum of screen white as measured by a reference color measurement instrument (e.g., a spectroradiometer). S is an m×n matrix containing the channel responses of a target (e.g., field) color measurement instrument to the plurality of settings of a tunable light source. CMF is an m×3 matrix containing the tristimulus values of a plurality of settings of the tunable light source as measured by the reference color measurement instrument. REF is a k×3 matrix containing the tristimulus values of a plurality of settings of a reference light emitting device as measured by the reference color measurement instrument. R is a k×n matrix containing the channel responses of the target color measurement instrument to the plurality of settings of the target light emitting device. The calibration matrix CM that is computed according to EQN. 1 is an n×3 matrix, where n is the number of channels in the multi-channel color measurement instrument, and 3 is the number of tristimulus values (e.g., X, Y, Z) in a color measurement.

In one example of the present invention, the matrices REF and W may be computed in the factory (before and/or after the fielded color measurement instrument leaves the factory), using a reference display (of the same make and model as the new display for which the fielded color measurement instrument is to be calibrated) and a spectroradiometer. The matrix CMF may be computed in the factory (before the fielded color measurement instrument leaves the factory), using a tunable light source (e.g., a monochromator) and the spectroradiometer. The matrix S may be computed in the factory before the fielded color measurement instrument leaves the factory, using the tunable light source. The matrices REF, CMF, and/or S may be stored on the fielded color measurement instrument before the fielded color measurement instrument leaves the factory. The matrices CMF, REF, W, and/or S may also be transmitted via a communications network to the fielded color measurement instrument or to a processor communicatively coupled to the fielded color measurement instrument after the fielded color measurement instrument leaves the factory. The matrix R may be generated using new measurements of the channel responses of the fielded color measurement instrument to the new display. The fielded color measurement instrument or the coupled processor may then recompute the calibration matrix CM using the matrices CMF, REF, W, and/or S (generated in the factory), and the new matrix R (generated by the fielded color measurement instrument), e.g., according to EQN. 1.

In further examples of the present disclosure, no tunable light source may be used. In this case, the matrices REF and W may be computed in the factory (before and/or after the fielded color measurement instrument leaves the factory), using the reference display and the spectroradiometer. The matrices REF and W can then be stored on the fielded color measurement instrument before the fielded color measurement instrument leaves the factory, or transmitted via a communications network to the fielded color measurement instrument or to the processor communicatively coupled to the fielded color measurement instrument after the fielded color measurement instrument leaves the factory. The matrix R may be generated using new measurements of the channel responses of the fielded color measurement instrument to the new display. The fielded color measurement instrument or the coupled processor may then recompute the calibration matrix CM using the matrices REF and W (generated in the factory), and the new matrix R (generated by the fielded color measurement instrument), e.g., according to EQN. 2 (below).

Within the context of the present disclosure, a "channel" of a color measurement instrument is understood to refer to a filter/detector pair that is configured to detect emitted light of a particular wavelength or range of wavelengths. In one example, a color measurement device that is calibrated according to examples of the present invention has at least three such channels.

To further aid in understanding the present disclosure, FIG. 1 illustrates an example system 100 in which examples of the present disclosure for calibrating a multi-channel color measurement instrument in the field may operate. The system 100 may include one or more types of communication networks, including a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises (also referred to as the/a "cloud"). In accordance with the present disclosure, the core network 102 may include an application server (AS) 104 and a database (DB) 106.

Figure 3:
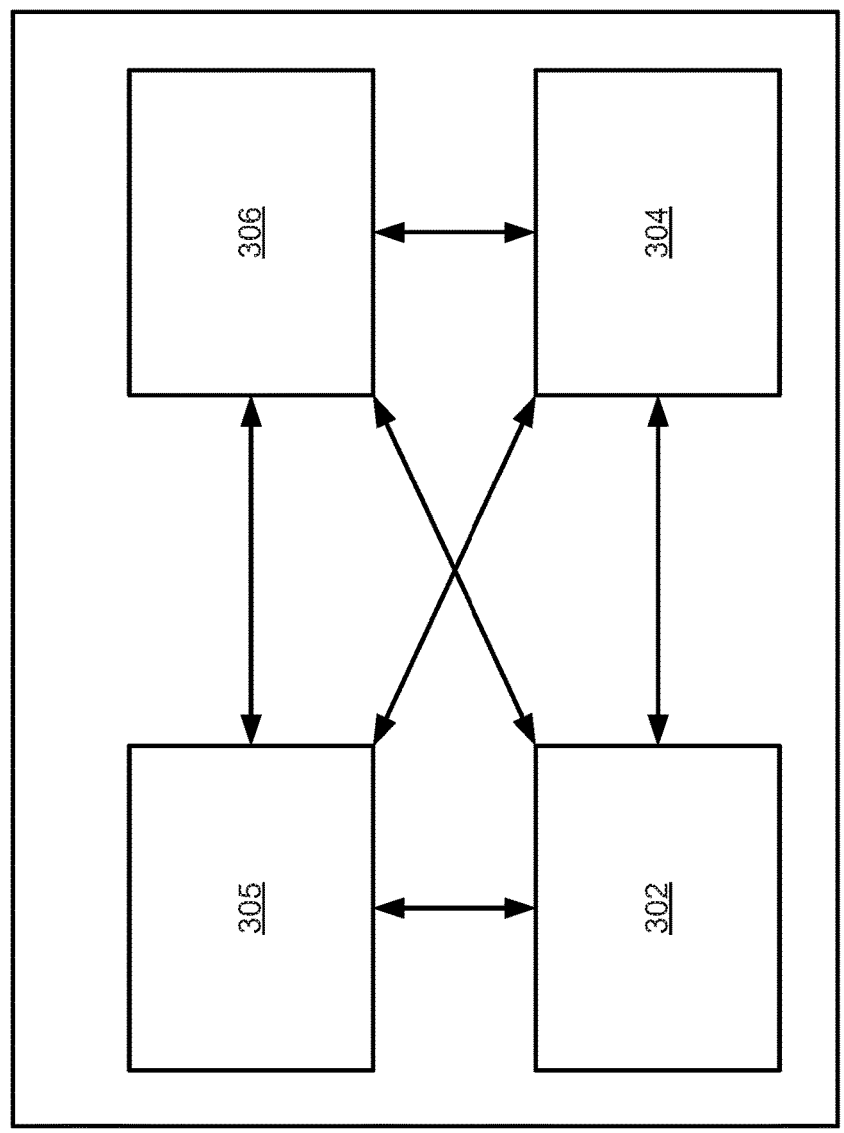
FIG. 3 is a high level block diagram of the calibration method that is implemented using a general purpose computing device.

The AS 104 may comprise a computing system or server, such as the computing system 300 depicted in FIG. 3, and may be configured to provide one or more operations or functions for calibrating a multi-channel color measurement instrument in the field, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The AS 104 may be communicatively coupled to a database (DB) 106. The DB 106 may store data that is used by the AS 104 to perform operations or functions for calibrating a multi-channel color measurement instrument in the field, as described herein. For instance, the DB 106 may store data including calibration matrices CM for various makes and models of color measurement instruments. The DB 106 may also store one or more of the intermediate matrices CMF, S, R, REF, and/or W that may be used to compute the calibration matrices CM for various makes and models of color measurement instruments.

Although only a single application server (AS) 104 and a single database (DB) 106 are illustrated in FIG. 1, it should be noted that any number of servers and databases may be deployed. For instance, a plurality of servers and databases may operate in a distributed and/or coordinated manner as a processing system to perform operations for calibrating a multi-channel color measurement instrument in the field, in accordance with the present disclosure. For ease of illustration, various additional elements of network 102 are omitted from FIG. 1.

The network 102 may be in communication with one or more endpoint devices, e.g., via one or more access networks (not shown). In one example, the endpoint devices may include field endpoint devices and factory endpoint devices which may be remotely located from each other and may communicate with each other via the core network 102. Dashed lines between endpoint devices indicate the emission of light (where the directions of the arrows on the dashed lines indicate the emitting and detecting devices). Solid lines between endpoint devices indicate the transfer of data, such as matrices used for calibration (where the directions of the arrows on the solid lines indicate the sending and receiving devices).

In one example, the field endpoint devices may include at least a fielded light emitting device 108 (e.g., an object or device that emits light in one or more colors, such as an LED lamp, a computer monitor, a television, a projector, a tablet computer, a mobile phone, or the like that has left the factory), a fielded color measurement instrument 110 (e.g., a colorimeter or the like that has left the factory and that has n channels, where n is at least three), and a computing device 112 (e.g., a desk top computer, a laptop computer, a tablet computer, or the like). The fielded color measurement instrument 110 is coupled to the fielded light emitting device 108. Coupling the fielded color measurement instrument 110 to the fielded light emitting device 108 may involve placing the fielded color measurement instrument 110 in proximity with the fielded light emitting device 108, so that the fielded color measurement instrument 110 can sense the colors of the light emitted by the fielded light emitting device 108. In this example, the coupling of the fielded color measurement instrument 110 to the fielded light emitting device 108 is non-permanent. In another example, however, the fielded color measurement instrument 110 may be embedded (e.g., permanently) in the fielded light emitting device 108. In this case, the fielded color measurement instrument 110 may comprise a silicon chip fronted by a plurality of integral color filters and detectors.

The computing device 112 may be coupled (e.g., via a wired or wireless connection) to the fielded color measurement instrument 110, so that the computing device 112 can receive color measurement outputs (e.g., responses of the color channels to various spectral settings of the fielded light emitting device 108) from the fielded color measurement instrument 110 (e.g., where the measurement outputs are encoded in electronic signals sent by the fielded color measurement instrument 110 to the computing device 108). In one example, the color measurement outputs may be contained in a matrix R. In one example, the computing device 108 may convert these color measurement outputs to CIE XYZ values, as described in greater detail below in connection with FIG. 2. In another example, the computing device 112 may send updated calibration matrices CM, as well as control signals, to the fielded color measurement instrument 110 (where the updated calibration matrices and control signals are also encoded in electronic signals).

In one example, the factory endpoint devices may include at least a reference light emitting device (e.g., an LED lamp, a computer monitor, a television, a projector, a tablet computer, a mobile phone, or the like of the same make and model as the fielded light emitting device), the color measurement instrument (before fielding) 110, and a spectroradiometer 120. In other words, the color measurement instrument (before fielding) 110 that is shown in dashed lines in the factory in FIG. 1 is the same instrument as the fielded color measurement instrument 110, just before the fielded color measurement instrument leaves the factory. In a further example, the factory endpoint devices may also optionally include a tunable light source 118 (e.g., a monochromator or the like).

Any one or more of the field endpoint devices and/or the factory endpoint devices may connect to the core network 102 via an access network (not shown) and may comprise a computing system or device, such as computing system 300 depicted in FIG. 3, that is configured to provide one or more operations or functions in connection with examples of the present disclosure for calibrating a multi-channel color measurement instrument in the field, as described herein.

In one example, the color measurement instrument (before fielding) 110 may be initially calibrated in the factory (e.g., on the reference light emitting device 114), and an initial calibration matrix CM may be stored in the local memory of the color measurement instrument (before fielding) 110. As discussed above, in order to compute the calibration matrix CM, one or more intermediate matrices (e.g., REF, CMF, S, and/or W) are first generated in the factory.

Generating the matrix REF may involve cycling the reference light emitting device 114, which is of the same make and model as the fielded light emitting device 108, through a plurality of different settings and measuring the spectroradiometer's responses to those settings.

Generating the matrix W may involve cycling the reference light emitting device 114 through the spectrum of screen white and measuring the spectroradiometer's responses to the different spectra.

In one example, where the tunable light source 118 is used for calibration, generating the matrix CMF may involve cycling the tunable light source through a plurality of different settings and measuring the spectroradiometer's responses to those settings.

Generating the matrix S may involve cycling the tunable light source through a plurality of different settings and measuring the responses of the color measurement instrument (before fielding) 110 to those settings.

In one example, one or more of the intermediate matrices CMF, REF, and/or S used to calculate the calibration matrix CM may be stored in the local memory of the color measurement instrument (before fielding) 110. The calibration matrix CM may be computed as discussed above (or as discussed by Xu). Alternatively, the calibration matrix may be computed in a manner that omits the intermediate matrices CMF and S (e.g., without using the tunable light source 118).

Optionally, the calibration matrix CM (and optionally one or more of the intermediate matrices CMF, REF, and/or S) may also be stored in the DB 106. Moreover, when the color measurement instrument (before fielding) 110 leaves the factory, becomes the fielded color measurement instrument 110, and is communicatively coupled to the computing device 112, the calibration matrix CM (and optionally one or more of the intermediate matrices CMF, REF, and/or S) may be stored in the local memory of the computing device 112 (e.g., by transfer from the fielded color measurement instrument 110 or download from the DB 106).

While in the field, the fielded color measurement instrument 110 may encounter the fielded light emitting device 108, which may be of a make and/or model for which the fielded color measurement instrument 110 has not been calibrated. In this case, the fielded color measurement instrument 110 may send a request to the computing device 112 to initiate a recalibration of the fielded color measurement instrument 110 for the fielded light emitting device 108. The computing device 112 may, in turn, send a signal to the fielded color measurement instrument 110 to generate the intermediate matrix R. Generating R may involve cycling the fielded light emitting device 108 through a plurality of different settings and measuring the fielded color measurement instrument's channel responses to those settings.

The computing device 112 may also send signals to the fielded color measurement instrument 110, the DB 106, and/or the factory endpoint devices to retrieve the intermediate matrices REF and W (and optionally CMF and S).

All of the intermediate matrices, i.e., R as newly generated by the fielded color measurement instrument 110, REF and W as generated in the factory by the spectroradiometer 120, and optionally CMF and S as generated in the factory by the spectroradiometer 120 and the color measurement instrument (before fielding) 110, respectively, may be acquired by one device. In the illustrated example, this one device is the computing device 112. However, in other examples, this one device may be the fielded color measurement instrument 110 or the AS 104. The one device may then compute the new calibration matrix CM.

As discussed above, if the tunable light source 118 is used for calibration, then the new calibration matrix may be computed according to EQN. 1. However, in some cases, the new calibration matrix may be computed without loss of accuracy (or with negligible loss of accuracy) without using the tunable light source 118. In this case, the new calibration matrix CM may be computed according to:

$$CM = \text{pinv}\{W^*[R]\}^* W^*[\text{REF}] \quad \text{(EQN. 2)}$$

In another example, the weighting matrix W can be omitted, so that the computation becomes:

$$CM = \text{pinv}[R]^*[\text{REF}] \quad \text{(EQN. 3)}$$

Once computed, the new calibration matrix CM may be forwarded to the fielded color measurement instrument 110 for local storage and use. Going forward, the fielded color measurement instrument 110 may convert sensor vectors S0 from the fielded light emitting device 108 into CIE XYZ triplets according to:

$$XYZ = S0^*CM \quad \text{(EQN. 4)}$$

Here, XYZ is the row 3-vector of the estimated XYZ tristimulus values of the light emitted by the fielded light emitting device 108, S0 is the row n-vector of the values measured by the fielded color measurement instrument 110, and CM is the n×3 calibration matrix defined above. Thus, by multiplying the output of the fielded color measurement instrument 110 by the calibration matrix CM, one can convert the outputs of the fielded color measurement instrument 110 to values that match the color matching functions of the standard observer (according to CIE 1931).

It should also be noted that the system 100 has been simplified. Thus, it should be noted that the system 100 may be implemented in a different form than that which is illustrated in FIG. 1 without departing from the scope of the present disclosure.

Figure 2:
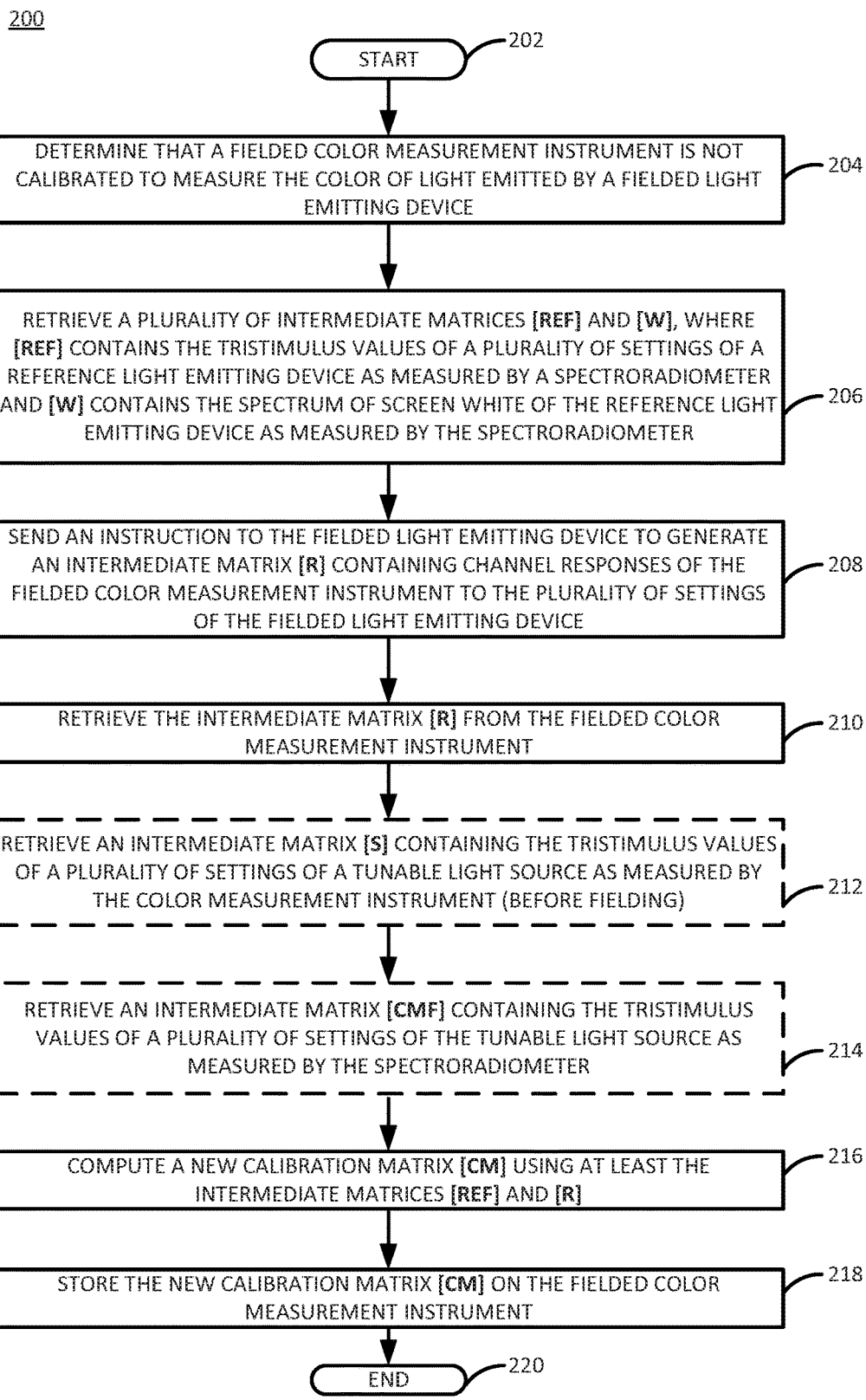
FIG. 2 is a flow chart illustrating one example of a method for calibrating a multi-channel color measurement instrument in the field.

FIG. 2 is a flow chart illustrating one example of a method 200 for calibrating a multi-channel color measurement instrument in the field. In one example, the number of channels in the multi-channel color measurement instrument is greater than or equal to three. In one example, the method 200 may be performed, for instance, by the AS 104 or the computing device 112 of FIG. 1, using measurements generated by the multi-channel color measurement instrument (e.g., fielded color measurement instrument 110) and by a factory-located spectroradiometer (e.g., spectroradiometer 120). In another example, the method 200 may be performed by the multi-channel color measurement instrument (e.g., fielded color measurement instrument 110 of FIG. 1). In another example, the method 200 may be performed by a processor of a computing device, such as the processor 302 illustrated in FIG. 3. For the sake of example, the method 300 is described below as being performed by a processing system.

In one example, the method 200 constructs and employs a calibration matrix. The calibration matrix may be constructed by multiplying a first matrix, weighted by weighting matrix, by a Moore-Penrose pseudoinverse of a second matrix, also weighted by the weighting matrix. In this case, both the first matrix and the second matrix are constructed using measurements of a first plurality of lights (from a reference light emitting device) and a second plurality of lights (from a fielded light emitting device). In particular, the first matrix is constructed using measurements of the reference light emitting device by a spectroradiometer, while the second matrix is constructed using measurements of the fielded light emitting device by a fielded color measurement instrument.

In a further (optional) example, the first matrix may be appended with a third matrix, while the second matrix may be appended with a fourth matrix. In this case, the third matrix is constructed using measurements of a tunable light source (e.g., a monochromator) by the spectroradiometer, while the fourth matrix is constructed using measurements of the tunable light source by the fielded color measurement instrument before the fielded color measurement instrument is fielded (e.g., before the fielded color measurement instrument leaves the factory).

The method 200 begins in step 202. In step 204, the processing system may determine that a fielded color measurement instrument (e.g., a color measurement instrument that has left the factory for the field, such as a colorimeter) is not calibrated to measure the color of a fielded light emitting device (e.g., a light emitting device that has left the factory for the field). For instance, the fielded light emitting device may be of a make and/or model for which the fielded color measurement instrument has not been calibrated. In this case, the local storage of the fielded color measurement instrument may contain a calibration matrix CM, but the calibration matrix CM may not contain the coefficients needed to accurately transform sensor values measured by the fielded color measurement instrument in response to the fielded light emitting device into the CIE XYZ color space.

In step 206, the processing system may retrieve a first plurality of intermediate matrices, namely, REF and W. In one example, the matrix REF (e.g., the first matrix referenced above) contains the tristimulus values of a plurality of settings of a reference light emitting device (e.g., a light emitting device that has not left the factory and that is of the same make and model as the fielded light emitting device) as measured by a spectroradiometer. Thus, in one example, the matrix REF is an m×3 matrix, where m is the number of settings of the reference light emitting device and 3 is the number of measured XYZ tristimulus values of each setting of them settings. In this case, each element $REF_{i,j}$ of the matrix REF represents the $j^{th}$ output (where j is a set of X, Y, Z tristimulus values) of the spectroradiometer in response to the $i^{th}$ setting of the reference light emitting device.

In one example, the matrix W (e.g., the weighting matrix referenced above) is a diagonal matrix (e.g., a diagonal square matrix) containing the spectrum of screen white (of the reference light emitting device) as measured by the spectroradiometer.

In one example, the intermediate matrices REF and W may be stored in the local memory of the fielded color measurement instrument before the fielded color measurement instrument leaves the factory. In this case, the intermediate matrices REF and W may be retrieved from the fielded color measurement instrument in step 206. In another example, the intermediate matrices REF and W may be stored in a database (e.g., in the cloud) after being generated.

In this case, the intermediate matrices REF and W may be retrieved from the database in step 206. In another example, the intermediate matrices REF and W may be retrieved from the spectroradiometer in step 206. For instance, the fielded color measurement instrument or the spectroradiometer may send an electronic signal encoding the intermediate matrices REF and W to the processing system, or the processing system may download the intermediate matrices REF and W from the database. In any case, the intermediate matrices REF and W are originally generated in the factory.

In step 208, the processing system may send an instruction to the fielded light emitting device to generate an intermediate matrix R. In one example, the matrix R (e.g., the second matrix referenced above) contains the channel responses of the fielded color measurement instrument to the plurality of settings of the fielded light emitting device. Thus, in one example, the matrix R is an m×n matrix, where m is the number of settings of the fielded light emitting device and n is the number of channels of the fielded color measurement instrument. In this case, each element $R_{i,j}$ of the matrix R represents the response of the $i^{th}$ channel of the fielded color measurement instrument to the $j^{th}$ setting of the light emitting device.

In step 210, the processing system may retrieve the intermediate matrix R from the fielded color measurement instrument. For instance, the fielded color measurement instrument may send an electronic signal encoding the intermediate matrix R to the processing system.

In optional step 212 (illustrated in phantom), the processing system may retrieve an intermediate matrix S. In one example, the matrix S (e.g., the fourth matrix referenced above) contains the channel responses of the fielded color measurement instrument to a plurality of settings of a tunable light source. The matrix S may be generated in the factory, however, i.e., before the fielded color measurement instrument leaves the factory. Thus, in one example, the matrix S is a w×n matrix, where w is the number of spectral settings of the tunable light source and n is the number of channels of the factory-located color measurement instrument. In this case, each element $S_{i,j}$ of the matrix S represents the response of the $i^{th}$ channel of the factory-located color measurement instrument at the $j^{th}$ spectral setting of the tunable light source.

In one example, the intermediate matrix S may be stored in the local memory of the fielded color measurement instrument before the fielded color measurement instrument leaves the factory. In this case, the intermediate matrix S may be retrieved from the fielded color measurement instrument in step 212. In another example, the intermediate matrix S may be stored in a database (e.g., in the cloud) after being generated. In this case, the intermediate matrix S may be retrieved from the database in step 212. For instance, the fielded color measurement instrument may send an electronic signal encoding the intermediate matrix S to the processing system, or the processing system may download the intermediate matrix S from the database. In any case, the intermediate matrix S is originally generated in the factory.

In optional step 214 (illustrated in phantom), the processing system may retrieve an intermediate matrix CMF. In one example, the matrix CMF (e.g., the third matrix referenced above) contains the tristimulus values of a plurality of settings of the tunable light source as measured by the spectroradiometer. Thus, in one example, the matrix CMF is a w×3 matrix, where w is the number of spectral settings of the tunable light source and 3 is the number of measured XYZ tristimulus values of each setting of the w spectral settings.

In one example, the intermediate matrix CMF may be stored in the local memory of the fielded color measurement instrument before the fielded color measurement instrument leaves the factory. In this case, the intermediate matrix CMF may be retrieved from the fielded color measurement instrument in step 214. In another example, the intermediate matrix CMF may be stored in a database (e.g., in the cloud) after being generated. In this case, the intermediate matrix CMF may be retrieved from the database in step 214. In another example, the intermediate matrix CMF may be retrieved from the spectroradiometer in step 214. For instance, the fielded color measurement instrument or the spectroradiometer may send an electronic signal encoding the intermediate matrix CMF to the processing system, or the processing system may download the intermediate matrix CMF from the database. In any case, the intermediate matrix CMF is originally generated in the factory.

In step 216, the processing system may compute a new calibration matrix CM using at least some of the intermediate matrices. For instance, where a tunable light source is not used, the new calibration matrix CM may be computed according to EQN. 2 using the intermediate matrices REF, R, and W (or according to EQN. 3 using the intermediate matrices REF and R). Where a tunable light source is used, the new calibration matrix CM may be computed according to EQN. 1, using the intermediate matrices CMF, S, REF, W, and R. In either case, the new calibration matrix CM includes coefficients for transforming sensor values measured by the fielded color measurement instrument on the fielded light emitting device into color measurement values that correspond to the CIE XYZ color space. Moreover, the new calibration matrix CM is computed from intermediate matrices that are originally generated both in the factory (e.g., REF, W, CMF, and/or S) and in the field (e.g., R).

In step 218, the processing system may store the new calibration matrix CM on the fielded color measurement instrument, so that the fielded color measurement instrument may be used to measure the color of light emitted by the fielded light emitting device. In addition, the new calibration matrix CM may be stored on a computing device that is communicatively coupled to the fielded color measurement instrument (e.g., computing device 112 of FIG. 1) and/or in a remote database (e.g., DB 106 of FIG. 1).

The method 200 may end in step 220.

The method 200 therefore allows a fielded color measurement instrument which has left the factory to be calibrated, without being returned to the factory, for a new display type or display type setting. The method uses a combination of information newly measured by the fielded color measurement instrument using the new display type or display type setting, and information originally measured in the factory by a spectroradiometer and/or the fielded color measurement instrument (but before the fielded color measurement instrument leaves the factory). The resulting new calibration matrix, which is an aggregation of these different parts generated in different locations, can be stored on the fielded color measurement instrument for use in calibrating the new display type or display type setting. This approach eliminates the need to have a whole production line setup for calibrating the new display or display type setting, as only one measurement of the new display type or display type setting is needed.

The disclosed approach may also be generalized. For instance, every display colorimeter manufactured in the factory can be trained in the factory on a tunable light source (e.g., a monochromator) and sent out into the field. Subsequently, measurements of different displays by a spectroradiometer in the factory can be made available in the cloud (e.g., stored in a remote database). Then, based on the display being measured, a screen colorimeter in the field can be calibrated for the display first using data from the spectroradiometer, and a calibration matrix can be generated and saved on the screen colorimeter for future calibrations.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 is a high level block diagram of the calibration method that is implemented using a computing device 300. In one example, a general purpose computing device 300 comprises a processor 302, a memory 304, a calibration module 305 and various input/output (I/O) devices 306 such as a display, a keyboard, a mouse, a modem, a network connection and the like. In one example, at least one I/O device is a storage device (e.g., a disk drive, an optical disk drive, a floppy disk drive). It should be understood that the calibration module 305 can be implemented as a physical device or subsystem that is coupled to a processor through a communication channel.

Alternatively, the calibration module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Additionally, the software may run in a distributed or partitioned fashion on two or more computing devices similar to the general purpose computing device 300. Thus, in one example, the calibration module 305 for calibrating a multi-channel color measurement instrument in the field described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various examples which incorporate the teachings of the present disclosure have been shown and described in detail herein, those skilled in the art can readily devise many other varied examples that still incorporate these teachings.

What is claimed is:

1. A method, comprising:
    obtaining, by a processing system of a fielded color measurement instrument comprising a plurality of color channels, a first response of the fielded color measurement instrument to light emitted by a fielded light emitting device, wherein the fielded color measurement instrument has not been calibrated to measure a color of the light emitted by the fielded light emitting device;
    obtaining, by the processing system, a calibration matrix, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument;
    obtaining, by the processing system, a second response of the fielded color measurement instrument to the light emitted by the fielded light emitting device; and
    converting, by the processing system, the second response into a triplet that corresponds to a Commission Internationale de L'éclairage XYZ color space by multiplying second response by the calibration matrix.

2. The method of claim 1, wherein the fielded color measurement instrument is a color measurement instrument that has left a first factory.

3. The method of claim 2, wherein the fielded light emitting device is a light emitting device that has left a second factory.

4. The method of claim 2, wherein the spectroradiometer has remained in the first factory after the fielded color measurement instrument has left the first factory.

5. The method of claim 1, wherein the fielded color measurement instrument is a colorimeter.

6. The method of claim 1, wherein the calibration matrix is assembled by:
    retrieving a first matrix, wherein each row of the first matrix contains three tristimulus values of one light of the second plurality of lights, as measured by the spectroradiometer;
    multiplying the first matrix by a weighting matrix to produce a weighted first matrix;
    retrieving a second matrix, wherein each row of the second matrix contains three tristimulus values of one light of the first plurality of lights, as measured by the fielded color measurement instrument;
    weighting the second matrix by the weighting matrix to produce a weighted second matrix; and
    multiplying the weighted first matrix by a Moore-Penrose pseudoinverse of the weighted second matrix.

7. The method of claim 6, wherein the weighting matrix comprises a square matrix containing a spectrum of screen white of the reference light emitting device, as measured by the spectroradiometer.

8. The method of claim 6, wherein the calibration matrix is further assembled by:
    retrieving a third matrix, wherein each row of the third matrix contains three tristimulus values for one spectral setting of a tunable light source, as measured by the spectroradiometer; and
    appending the first matrix with the third matrix.

9. The method of claim 8, wherein constructing the calibration matrix is further assembled by:
    retrieving a fourth matrix, wherein each row of the fourth matrix contains three tristimulus values for one spectral setting of the tunable light source, as measured by the fielded color measurement instrument during an initial calibration of the fielded color measurement instrument; and
    appending the second matrix with the fourth matrix.

10. The method of claim 6, wherein the second matrix is measured by the fielded color measurement instrument in response to an instruction from the processing system.

11. The method of claim 6, wherein the first matrix is stored in a local memory of the fielded color measurement instrument subsequent to being measured.

12. The method of claim 6, wherein the first matrix is stored in a database that is accessible to the processing system subsequent to being measured.

13. The method of claim 1,
    wherein the calibration matrix is stored on a computing device communicatively coupled to the fielded color measurement instrument.

14. The method of claim 1,
    wherein the calibration matrix is stored in a database that is accessible to the processing system.

15. A non-transitory computer-readable medium storing instructions which, when executed by a processor of a fielded color measurement instrument comprising a plurality of color channels, cause the processor to perform operations, the operations comprising:
    obtaining a first response of the fielded color measurement instrument to light emitted by a fielded light emitting device, wherein the fielded color measurement instrument has not been calibrated to measure a color of the light emitted by the fielded light emitting device;
    obtaining a calibration matrix, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument;
    obtaining a second response of the fielded color measurement instrument to the light emitted by the fielded light emitting device; and
    converting the second response into a triplet that corresponds to a Commission Internationale de L'éclairage XYZ color space by multiplying the second response by the calibration matrix.

16. The non-transitory computer-readable medium of claim 15, wherein the calibration matrix is assembled by:
    retrieving a first matrix, wherein each row of the first matrix contains three tristimulus values of one light of the second plurality of lights, as measured by the spectroradiometer;
    multiplying the first matrix by a weighting matrix to produce a weighted first matrix;
    retrieving a second matrix, wherein each row of the second matrix contains three tristimulus values of one light of the first plurality of lights, as measured by the fielded color measurement instrument;

weighting the second matrix by the weighting matrix to produce a weighted second matrix; and multiplying the weighted first matrix by a Moore-Penrose pseudoinverse of the weighted second matrix.

17. The non-transitory computer-readable medium of claim 16, wherein the weighting matrix comprises a square matrix containing a spectrum of screen white of the reference light emitting device, as measured by the spectroradiometer.

18. The non-transitory computer-readable medium of claim 16, wherein the calibration matrix is further assembled by:

retrieving a third matrix, wherein each row of the third matrix contains three tristimulus values for one spectral setting of a tunable light source, as measured by the spectroradiometer; and appending the first matrix with the third matrix.

19. The non-transitory computer-readable medium of claim 18, wherein the calibration matrix is further assembled by:

retrieving a fourth matrix, wherein each row of the fourth matrix contains three tristimulus values for one spectral setting of the tunable light source, as measured by the fielded color measurement instrument during an initial calibration; and appending the second matrix with the fourth matrix.

20. A fielded color measurement instrument comprising a plurality of color channels, the fielded color measurement instrument comprising:

a processor; and a non-transitory computer-readable medium storing instructions which, when executed by the processor, cause the processor to perform operations comprising:

obtaining a first response of the fielded color measurement instrument to light emitted by a fielded light emitting device, wherein the fielded color measurement instrument has not been calibrated to measure a color of the light emitted by the fielded light emitting device;

obtaining a calibration matrix, wherein the calibration matrix contains measurements made by the fielded color measurement instrument of a first plurality of lights emitted by the fielded light emitting device and measurements made by a spectroradiometer of a second plurality of lights emitted by a reference light emitting device of a same make and model as the fielded light emitting device, wherein the spectroradiometer is located remotely from the fielded color measurement instrument;

obtaining a second response of the fielded color measurement instrument to the light emitted by the fielded light emitting device; and converting the second response into a triplet that corresponds to a Commission Internationale de L'éclairage XYZ color space by multiplying the second response by the calibration matrix.

* * * * *